Oct. 7, 1952 D. C. ZEIS 2,612,999
ROTARY MILK CAN AND BUCKET RACK
Filed March 13, 1950 2 SHEETS—SHEET 1

INVENTOR.
Donald C. Zeis
BY Victor J. Evans & Co.
ATTORNEYS

Oct. 7, 1952 D. C. ZEIS 2,612,999
ROTARY MILK CAN AND BUCKET RACK
Filed March 13, 1950 2 SHEETS—SHEET 2
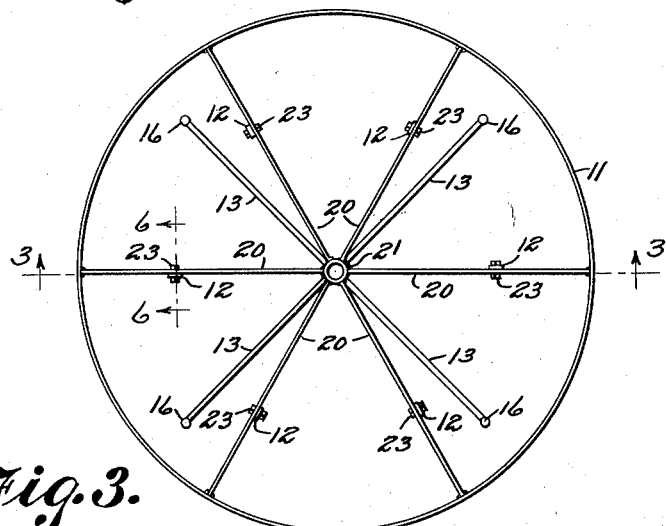
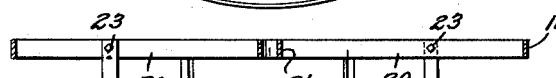
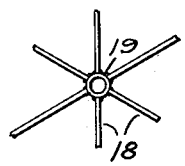
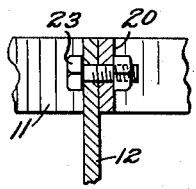
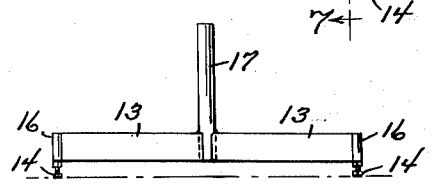
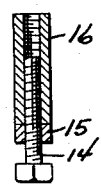
INVENTOR.
Donald C. Zeis
BY Victor J. Evans & Co.
ATTORNEYS Patented Oct. 7, 1952

2,612,999

UNITED STATES PATENT OFFICE 2,612,999

ROTARY MILK CAN AND BUCKET RACK

Donald C. Zeis, Cromers, Ohio

Application March 13, 1950, Serial No. 149,299

1 Claim. (Cl. 211—77)

This invention relates to milk can holding racks particularly adapted for use with milk and dairy equipment, and in particular a rack including circular upper and lower supporting members rotatably mounted on a spider or base having outwardly extended arms wherein the lower supporting member is positioned to hold milk cans in inverted positions and milk pails and the like may be carried by the upper supporting member.

The purpose of this invention is to provide maximum storage capacity in a minimum of space for milking equipment and in which milk cans and other equipment placed thereon are readily accessible.

Milk cans are usually stored in a long single row thereby occupying considerable space and where racks have been provided they are bolted to the floor or to a wall so that they are not portable and, therefore, complicate cleaning. With this thought in mind this invention contemplates a portable rack having spaced upper and lower can and pail supporting members with the parts thereof substantially open and with the milk cans and pails readily removable therefrom.

The object of this invention is, therefore, to provide means for constructing a portable rack having rotating supporting members with the supporting members adapted to retain milk cans, pails and other milking equipment.

Another object of the invention is to provide a portable milk can carrying rack on which milk cans, pails and other milking equipment may be positioned without changing the design or arrangement of the equipment and without bolting or otherwise attaching the equipment to the rack.

A further object of the invention is to provide a compact portable milking equipment rack having spaced rotatable horizontally disposed supporting members which is of a simple and economical construction.

With these and other objects and advantages in view the invention embodies a milking equipment rack having a spider formed with radially diposed arms having a vertically positioned shaft mounted thereon, a horizontally disposed supporting member having a centrally positioned vertically disposed tube positioned over the vertically positioned shaft of the base and a superimposed supporting member supported from the former supporting member by spaced vertically positioned bars.

Other features and advantages of the invention will appear from the following description taken in connection with the drawings wherein:

Figure 2 is a plan view showing the supporting members with the arms of the supporting base or spider below.

Figure 3 is a vertical section through the rack taken on line 3—3 of Figure 2.

Figure 4 is a detail illustrating the connection of the arms of the supporting members to the hubs.

Figure 5 is a detail illustrating the spider, forming the base and showing a side elevational view thereof.

Figure 6 is a detail showing a section taken on line 6—6 of Figure 2.

Figure 7 is a detail showing a section taken on line 7—7 of Figure 3 illustrating the adjusting means in the ends of the arms of the spider.

Figure 1:
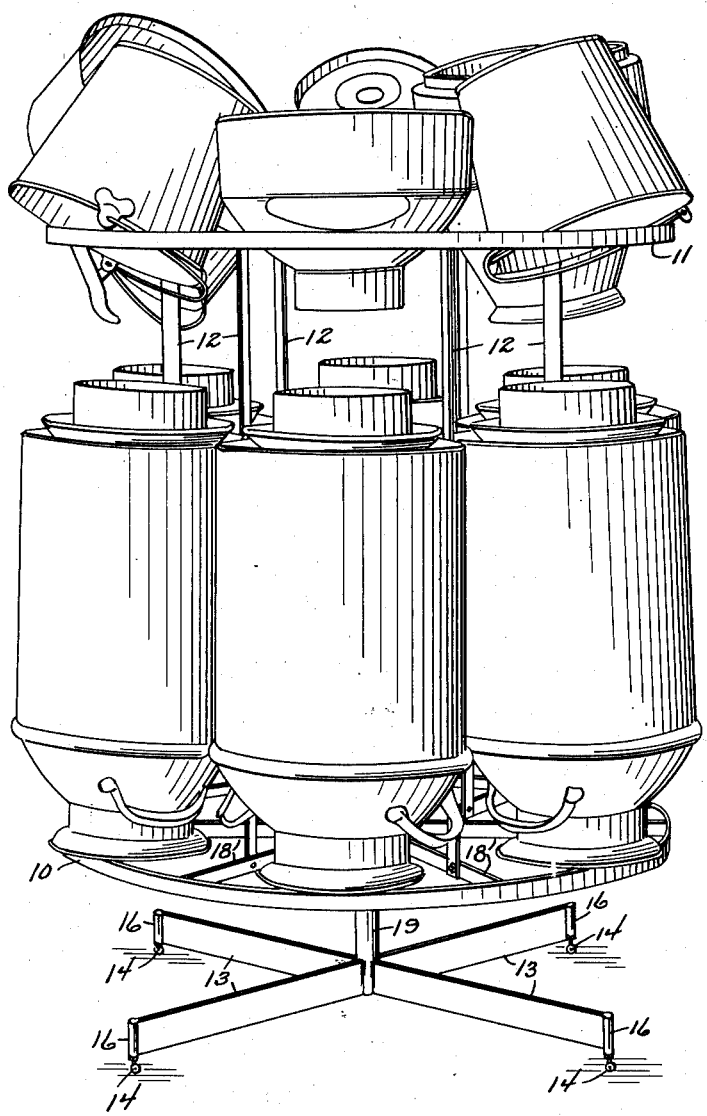
Figure 1 is a front elevational view illustrating a portable milking equipment rack with cans in the inverted positions on the lower supporting member, with milk pails and the like on the upper supporting member and with the milk can covers positioned on the upper ends of the cans.

Referring now to the drawings wherein like reference characters denote corresponding parts the milking equipment rack of this invention includes a lower supporting member 10, an upper supporting member 11 supported from the lower supporting member by vertically positioned bars 12 and a spider having outwardly extended radially disposed arms 13 with adjusting screws 14 having lock nuts 15 thereon threaded in hubs 16 on the outer ends and with a shaft 17 carried by the inner ends of the arms and extended upwardly therefrom.

The lower supporting member 10 is formed with a continuous band supported by radially positioned bars 18 which extend outwardly from the upper end of a tube 19 freely positioned over the shaft 17, and the supporting member 11 which is also formed with a continuous band supported by radially disposed arms 20, corresponding with the arms 18 of the supporting member 10, is superimposed above the supporting member 10 and supported by the bars 12 and the arms 20 are connected at the center by a hub 21, as shown.

The vertically positioned supporting bars 12 are attached by bolts 22 to the arms 18 of the supporting member 10 and by similar bolts 23 to the arms 20 of the supporting member 11, as shown in Figure 6.

With the parts arranged in this manner a sturdy milk can supporting rack is provided with the upper supporting member 11 rigidly supported from the lower supporting member 10 and with both of the supporting members rotatably mounted on the spider or base by the sleeve or tube 19 that is freely positioned over the shaft 17.

In setting the rack upon a floor ends of the arms 13 of the spider are adjusted by the bolts 14 so that supporting members of the rack are level and the rack is free to rotate about the vertically disposed shaft 17. The nuts 15 are tightened on the bolts 14 to secure the rack in the level or vertically disposed position.

The rack may readily be moved from one position to another and as cans, pails, and other milking equipment are placed upon the supporting members the supporting members are rotated on the base to facilitate placing the cans and the like thereon and also to facilitate removing equipment therefrom.

It will be understood that modifications may be made in the design and arrangement of the parts without departing from the spirit of the invention.

What is claimed is:

In a rotatable milking equipment rack, the combination which comprises a spider having radially disposed arms with a vertically disposed arms with a vertically disposed centrally positioned shaft extended upwardly therefrom, bolts threaded in the outer ends of the arms of the spider, lock nuts on the said bolts, a tube freely positioned over the vertically positioned shaft, radially disposed arms extended outwardly from the upper end of the tube, a circular band carried by the outer ends of the radially disposed arms extended from the tube, spaced vertically positioned bars extended upwardly from the said arms on the upper end of the tube, corresponding radially positioned arms carried by the upper ends of the bars, a cylindrical band carried by the outer ends of the arms on the upper ends of the bars, and a hub connecting the inner ends of the arms on the upper ends of the bars.

DONALD C. ZEIS.

REFERENCES CITED

The following references are of record in the file of this patent:

UNITED STATES PATENTS

| Number | Name | Date |
|---|---|---|
| 932,931 | Willmann | Aug. 31, 1909 |
| 1,247,195 | Willett | Nov. 20, 1917 |
| 1,311,305 | Willett | July 29, 1919 |
| 1,836,780 | Strothoff | Dec. 15, 1931 |
| 1,893,755 | Wentworth | Jan. 10, 1933 |
| 2,449,628 | Swintosky | Sept. 21, 1948 |

FOREIGN PATENTS

| Number | Country | Date |
|---|---|---|
| 116,003 | France | Dec. 14, 1876 |